US008606727B2

(12) United States Patent
Wu et al.

(10) Patent No.: US 8,606,727 B2

(45) Date of Patent: Dec. 10, 2013

(54) METHOD AND SYSTEM FOR TRAFFIC PREDICTION BASED ON SPACE-TIME RELATION

(75) Inventors: Tao Wu, Beijing (CN); Shaoya Wang, Beijing (CN); Junjian He, Beijing (CN); Weisong Hu, Beijing (CN); Jia Rao, Beijing (CN); Xiaowei Liu, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 435 days.

(21) Appl. No.: 12/942,783

(22) Filed: Nov. 9, 2010

(65) Prior Publication Data

US 2011/0161261 A1 Jun. 30, 2011

(30) Foreign Application Priority Data

Dec. 28, 2009 (CN) .......................... 2009 1 0265617

(51) Int. Cl.
*G06F 15/18* (2006.01)

(52) U.S. Cl.
USPC .......................................................... 706/12

(58) Field of Classification Search
None
See application file for complete search history.

(56) References Cited

U.S. PATENT DOCUMENTS

| | | | | |
|---|---|---|---|---|
| 2008/0033630 | A1 * | 2/2008 | Lee et al. | 701/117 |
| 2008/0097686 | A1 * | 4/2008 | Takeuchi et al. | 701/117 |
| 2009/0070025 | A1 * | 3/2009 | Kumagai et al. | 701/117 |
| 2010/0070253 | A1 * | 3/2010 | Hirata et al. | 703/8 |

FOREIGN PATENT DOCUMENTS

| | | | |
|---|---|---|---|
| JP | 11-316891 | A | 11/1999 |
| JP | 2000-285362 | A | 10/2000 |
| JP | 2005-227972 | A | 8/2005 |
| JP | 2006-214974 | A | 8/2006 |
| JP | 2008-123474 | A | 5/2008 |
| JP | 2010-072986 | A | 4/2010 |

OTHER PUBLICATIONS

Kamarianakis, Prastacos, "Space-time Modeling of Traffic Flow", Computers and Geosciences, vol. 31, 2005, pp. 119-133.*

(Continued)

*Primary Examiner* — Kakali Chaki
*Assistant Examiner* — Walter Hanchak
(74) *Attorney, Agent, or Firm* — Sughrue Mion, PLLC

(57) ABSTRACT

A system and method for traffic prediction based on space-time relation are disclosed. The system comprises a section spatial influence determining section for determining, for each of a plurality of sections to be predicted, spatial influences on the section by its neighboring sections; a traffic prediction model establishment section for establishing, for each of the plurality of sections to be predicted, a traffic prediction model by using the determined spatial influences and historical traffic data of the plurality of sections; and a traffic prediction section for predicting traffic of each of the plurality of sections to be predicted for a future time period by using real-time traffic data and the traffic prediction model. An apparatus and method for determining spatial influences among sections, as well as an apparatus and method for traffic prediction, are also disclosed. With the present invention, a spatial influence of a section can be used as a spatial operator and a time sequence model can be incorporated, such that the influences on a current section by its neighboring section for a plurality of spatial orders can be taken into account. In this way, the traffic condition in a spatial scope can be measured more practically, so as to improve accuracy of prediction.

25 Claims, 4 Drawing Sheets

(56) References Cited

OTHER PUBLICATIONS

Lin, Huang, Zhu, Wang, "The Application of Space-Time ARIMA Model on Traffic Flow Forecasting", IEEE, Proceedings of the Eighth International Conference on Machine Learning and Cybernetics, Baoding, Jul. 2009, pp. 3408-3412.*

Nguyen, Scherer, "Imputation Techniques to Account for Missing Data in Support of Intelligent Transporation Systems Applications", Research Report No. UVACTS-13-0-78, University of Virginia, Charlottesville, VA, 2003, pp. 1-114.*

Berg, Hegyi, Schutter, Hellendoorn, "Integrated traffic control for mixed urban and freeway networks: A model predictivce control approach", European Journal of Transport and Infrastructure Research, vol. 7, No. 3, 2007, pp. 223-250.*

Office Action issued Jun. 21, 2012, by the People Republic of China in counterpart Chinese Application No. 2010-247289.

Shiliang Sun, et al., "Traffic Flow Forecasting Using a Spatio-temporal Bayesian Network Predictor", Proceedings of ICANN 2005, pp. 273-278.

Yiannis I. Kamarianakis, et al., "Space-Time Modeling of Traffic Flow", IEEE Transactions on Fuzzy Systems, 2002, pp. 1-22.

* cited by examiner

METHOD AND SYSTEM FOR TRAFFIC PREDICTION BASED ON SPACE-TIME RELATION

FIELD OF THE INVENTION

The invention relates to traffic information prediction, and more particularly, to a technology for predicting traffic information based on space-time relation.

BACKGROUND OF THE INVENTION

In modern society, automobiles are becoming increasingly widespread with the rapid economic growth, which imposes heavy pressures on urban traffic and causes severe traffic jams. It is an urgent issue to mitigate traffic congestions, so as to reduce travel time for automobile drivers, reduce fuel consumption, improve economic efficiency of a city and facilitate environment protection. Thus, the traffic information service system plays an important role in urban intelligent transport system. Prediction of traffic information is a core functionality of the traffic information service system, which is intended to mine history patterns of traffic information, predict urban traffic condition in near future and compensate delays in a traffic information service system. It also enables the drivers to be aware of the future traffic condition and drive in a stable mood. Furthermore, it is of significance that the prediction is based on the real-time traffic information gathering system while extending the real-time traffic information service to both the past and the future.

Currently, the rapid development of mobile communication technology and the popularization of GPS technology provide potentials for accurately gathering real-time traffic. In general, such a technology can be classified into a fixed probing technology and a mobile probing technology. The fixed probing technology involves gathering real-time traffic information and monitoring traffic conditions by fixed equipments, such as loops, RTMS (Remote Traffic Microwave Sensor) and monitoring cameras. On the other hand, the mobile probing technology comprises probe vehicle technology and probe mobile terminal technology. A probe vehicle refers to a vehicle equipped with both a GPS module and a mobile communication module; and the probe vehicle technology involves obtaining in real-time vehicle-related data such as geographical location data of a probe vehicle, uploading the data to a data center regularly via the mobile communication network, performing a map matching, path finding and traffic information fusion at a server side and, finally, disseminate real-time traffic information to the user terminals. In contrast, the mobile terminal probing technology involves obtaining cell locations of a large amount of mobile terminal users by means of base station positioning in a mobile communication network, analyzing users' behavior patterns, finding out a sequence of position points which can reflect the traffic condition, calculating real-time traffic information with reference to digital map data and providing real-time traffic information service.

However, the existing technologies for acquiring real-time traffic information cannot satisfy all user requirements. In most cases, a driver desires to know not only the current traffic condition, but also the traffic condition in the near future, so as to avoid congested roads. In addition, the current technologies for acquiring real-time traffic information suffer from a certain period of delay due to time consumptions during data transmission and system calculation, while the real-time traffic condition may vary rapidly. Therefore, the prediction of traffic information becomes particularly important in practical applications and thus becomes in recent years a topic of interest in world-wide research for intelligent transport systems.

Generally, the traffic information prediction technology establishes a suitable prediction model, such as a time sequence model, a neural network model, a Bayesian model, a fuzzy mathematical model, based on accumulated historical traffic information, so as to perform information prediction. A practical, applicable traffic information prediction system should satisfy two aspects of functionalities. First, from the perspective of time length of prediction, it is necessary to support short-term, mid-term and long-term predictions. Second, from the perspective of spatial scope of prediction, it is necessary to support traffic information prediction for the entire road network, rather than merely for arterial roads or highways. Meanwhile, the road network is complicated and has a large amount of data; and a prediction model itself is highly complicated. Thus, it is a vital but difficult research topic to achieve traffic information prediction with high performance and high accuracy.

There have been some patents and papers involving methods and models for traffic information prediction. Most of these methods, however, are based on arterial roads or highways, not complete road network, a low applicability and a relatively low model complexity. Further, most of these methods did not consider the spatial relations in a road network, but rather perform prediction modeling on each of individual roads by time series analysis, fuzzy mathematics, etc. For a few space-time prediction researches, there are also a variety of drawbacks. The related patents and papers will be introduced in the following.

Patent Document 1, "Travel-time Prediction Apparatus, Travel-time Prediction Method, Traffic Information Providing System and Program", US Patent No. 20080097686(A1), discloses a method for traffic information prediction based on an Auto-Regression (AR) time series model. It utilizes a single link as a processing element, establishes a time series sample data for link travel time based on historical traffic condition data and set up an AR model for traffic information prediction.

Patent Document 2, "System and Method of Predicting Traffic Speed Based on Speed of Neighboring Link", US Patent No. 20080033630(A1), discloses a method for predicting current link condition based on conditions of neighboring links. According to this solution, adjacent links at two endpoints of a single current link are calculated in advance, and then a relation between the current traveling speed on the current link and the traveling speeds on the adjacent links is derived from previous traveling speed on each of the links. Finally, the traffic condition prediction can be performed based on such a model.

Non-patent Document 1, "Traffic Flow Forecasting Using a Spatio-temporal Bayesian Network Predictor", Proceeding of ICANN 2005, discloses a method for traffic information prediction based on a space-time Bayesian network.

Non-patent Document 2, "Space Time Modeling of Traffic Flow", IEEE TRANSACTIONS ON FUZZY SYSTEMS, 2002, discloses a method for space-time modeling of traffic flow. According to this method, spatial features are incorporated into a prediction model by using a matrix of weights based on distance estimation, and then a space-time auto-regression moving average model can be established for short-term prediction of traffic information.

Among the above prior art solutions, Patent Document 1 establishes, on a link basis, an auto-regression model for travel time on each link for prediction. This solution, however, only considers the time domain while completely ignoring the interrelation among the road links. Moreover, it only reflects the historical traffic characteristics of a single link while failing to represent the influence of changes in traffic conditions of neighboring links on the current link. Patent Document 2 calculates the traveling speed on the current link based on the traveling speed on adjacent links. In fact, this solution involves no prediction of future traffic condition, but only calculation of traveling speeds on neighboring links based on a known link traveling speed. However, for traffic condition, the same traveling speed may imply different levels of congestion. It is thus improper to utilize speed as a sample value. Non-patent Document 1 uses a Bayesian network which is complicated in structure and very inefficient when applied to traffic information prediction for a large scale road network. Non-patent Document 2 teaches to distinguish the levels of influences of spatial relation based on distance while ignoring the influence of a key connection node on the road traffic flow. Meanwhile, this solution measures the road condition with traffic flow only, without taking into account that different levels of roads have themselves different capacities for accommodating traffic flows.

To summarize, the existing solutions are inadequate for traffic prediction, particularly for mining spatial relations, including determining the scope of spatial influence, allocating weights for spatial influence objects, unifying criteria for evaluation of traffic condition, as well as mining the relation between the historical traffic conditions of the current road and the roads within the scope of spatial influence. Further, some of the solutions select prediction models which are not extendable, so that the system efficiency decreases exponentially with the increase in prediction scope.

Obviously, it is insufficient to only establish a traffic information prediction model based on historical data and perform time sequence analysis on a single segment. The influences of precede/succeed roads should be considered as there are strong mutual influences among the road segments in the road network. For example, a road will be very likely to be congested if its succeed road is congested, and will be very likely to be unblocked if its precede road is not congested. Thus, it is desired to establish a traffic information prediction model taking into account analysis models in both space and time domains.

The time sequence model is a common prediction and control model, which finds out statistical regularities for prediction based on historical data. A Space-Time Auto Regression Moving Average (STARMA) model is a general time sequence model considering spatial relation, which is suitable for analysis space-time statistical data. This model is applicable in various fields such as regional economics and weather forecasting analysis. A core issue in utilization of this model is how to define the spatial relation, including which object to be used in spatial analysis, how to determine a spatial scope which has influence on a spatial object, and how to determine influence weights for individual spatial objects in the scope.

The present invention is directed to a method for traffic prediction based on space-time relation with high performance and high accuracy, which takes fully into account spatial characteristics of a road traffic network

SUMMARY OF THE INVENTION

To solve the above problems, according to an aspect of the present invention, a method for determining spatial influences among sections is provided, which comprise:

spatial scope determining step of determining, for each of sections in a road network, a spatial scope having influence on the section, wherein the spatial scope is of a spatial order of N, which is an integer equal to or greater than 1;

an influential section extraction step of extracting, from the road network, neighboring sections of the section within the determined spatial scope, as N-th order influential sections for the section;

a spatial relation determining step of classifying the spatial relation between each of the sections and each of its N-th order influential sections into one of predefined types of spatial relation;

a correlation learning step of performing, for the classified type of spatial relation, correlation analysis on historical traffic data of the section and its N-th order influential sections of this type of spatial relation, to learn a section correlation between the section and its N-th order influential sections for this type of spatial relation; and a spatial influence determining step of determining spatial influences of spatial order N for the section based on the learned section correlation, wherein each of the spatial influences reflects an extent to which the section is influenced by one of its N-th order influential sections.

In this way, the spatial relation within the road traffic network itself is fully utilized and the influence of changes in traffic conditions of neighboring sections on the current section is considered for spatial scopes of various spatial orders. As such, in actual prediction, any change in traffic condition at a node or on a section can be rapidly reflected in the corresponding spatial scope, which is impossible for the prediction algorithm considering only one single section.

In an embodiment, in the spatial scope determining step, the spatial scope having influence on the section is determined according to the relative spatial locations among the sections in the road network.

In this way, the influence scope can be determined from the perspective of relative spatial locations of segments in the road network, e.g., considering such factors as direct adjacency and/or relative distance from each other.

In an embodiment, in the spatial scope determining step, for each of the sections in the road network, a spatial scope reachable from the section within a preset time period is determined as the spatial scope having influence on the section.

In this way, the influence scope can be determined in terms of time. For example, a spatial scope can be determined as reachable within a preset time period by starting traveling from the current section at the current speed or an average speed based on historical data. The preset time period can be for example a traffic information gathering period or a multiple thereof, to further facilitate analysis of traffic data.

In an embodiment, in the correlation learning step, the spatial relation between each of the sections and each of its N-th order influential sections is classified into one of predefined types of spatial relation and, for the classified type of spatial relation, correlation analysis is performed on historical traffic data of the section and its N-th order influential sections of this type of spatial relation to learn a section correlation between the section and its N-th order influential sections for this type of spatial relation. In an embodiment, the predefined types of spatial relation comprise no relation, precede straight, precede merge, precede intersect, precede diverge, succeed straight, succeed merge, succeed intersect, and succeed diverge;

Alternatively, the predefined types of spatial relation comprise straightforward, left turn and right turn.

In this way, the spatial relations between a section and its influential sections can be classified into a variety of types, such that different influences resulted from different spatial relations can be considered differentially.

In an embodiment, in the spatial influence determining step, each of the N-th order influential sections of a section is allocated with an influential weight based on the correlation between the section and the N-th order influential section, and the spatial influence on the section by the N-th order influential section is determined based on the influential weight.

In this way, the extent to which the current section is influenced by each of its influential sections can be reflected with respect to different spatial relations.

In an embodiment, the spatial influences on a section by its N-th order influential sections are represented in a vector having a dimension equal to the number of its N-th order influential sections. Alternatively, the spatial influences among all of a plurality of sections are represented in a M×M matrix, M being equal to the number of the plurality of sections and each row or each column of the matrix representing the spatial influences on one of the plurality of sections by its N-th order influential sections.

In this way, the spatial relations among a plurality of sections can be reflected intuitively and compactly in a vector or a matrix, which can be conveniently substituted as a spatial operator into the time sequence model, so as to simplify the subsequent processes of modeling and prediction.

In an embodiment, the above method further determines, for a changed spatial order N, spatial influences for the changed spatial order N for each of the sections by the spatial scope determining step, the influential section extraction step, the spatial relation determining step, the correlation learning step and the spatial influence determining step. The above method further comprises a storage step of storing, for each of the sections, the determined spatial influences for at least one spatial order N.

In this way, the spatial relations among all the sections in the road traffic network can be fully considered to obtain, for each of a plurality of different spatial orders, influence of the changes in traffic condition of neighboring sections on the current section, such that the overall traffic condition can be reflected. Additionally, in actual prediction, it is possible to select a suitable spatial order based on the time period or traffic condition to be predicted, so as to determine a spatial scope to be considered for prediction. As such, the traffic prediction can be more flexible and effective.

In an embodiment, the historical traffic data comprise, for a particular time period in a day, at least one of the following historical traffic data for each section: a travel speed at which a vehicle travels along the section, a travel time period a vehicle requires for passing through the section, a section congestion indication representing a ratio between an actual travel time period a vehicle requires for passing through the section and a free flow travel time period a vehicle requires for passing through the section in a free flow condition, or representing a ratio between an actual travel speed at which a vehicle actually travels along the section and a free flow travel speed at which a vehicle travels along the section in a free flow condition.

As for traffic condition, the same travel speed/travel time may indicate different congestion levels. For example, the rated speeds for arterial roads and side roads are inherently and dramatically different from each other. Thus, the congestion level of a road cannot be properly reflected by only using speed/travel time as sample. According to the present invention, the congestion indication of a road is used as historical traffic data for analysis. In this way, the criterion for measuring traffic in a spatial scope is unified, and the traffic in the spatial scope can be measured more accurately, leading to an improved accuracy of prediction.

In an embodiment, a section comprises one of: a link as basic road element of a road network, a road segment obtained by analyzing a road network and building a mapping between road segments and links; and a road section from one intersection to another adjacent intersection in the road network.

In this way, the present invention employs a road section between road nodes, such as intersections which are considered as more important in the real world, as a basic data object, rather than based on the conventional link which has shorter length and less stable traffic characteristics. In addition, by using a road section obtained by restructuring links, it is possible to utilize a reduced number of integrated road sections as basic data objects, so as to improve calculation efficiency as well as prediction accuracy.

It is thus possible to establish, for each section, prediction models for different time scopes and spatial scopes by considering different situations of the section in different time periods, leading to a more flexible and effective traffic prediction.

According to another aspect of the present invention, a traffic prediction method is is provided, which comprises:

- a prediction input obtaining step of obtaining real-time traffic data for a plurality of sections within one or more time periods as a prediction input;
- a traffic prediction model selection step of selecting a traffic prediction model for each of the sections whose traffic is to be predicted, based on a future time period for which the prediction is to be made and/or a specified time order and/or spatial order, wherein the traffic prediction model is a time sequence model incorporating spatial relation, and the spatial relation is represented by the spatial influences among the sections as determined by the above method for determining spatial influences among segments; and
- a traffic prediction step of predicting traffic of each of the sections for a future time period after a specified time period by using the prediction input and the selected traffic prediction model.

The prediction may be more flexible by selecting the prediction model based on a future time period for which the prediction is to be made and/or a specified time order and/or spatial order.

In an embodiment, the traffic prediction model comprises a Space-Time Auto Regression (STAR) model or a Space-Time Auto Regression Moving Average (STARMA) model.

Herein, the STAR and the STARMA models are both general time sequence models considering spatial relation, which are suitable for analyzing space-time statistical data and mining statistical patterns for prediction based on historical data. The present invention employs such general time sequence models incorporating spatial relation, capable of introducing a novel spatial operator, without modifying basic models, to reflect the influence of changes in neighboring traffic on the current section. Accordingly, the accuracy of prediction can be improved.

In an embodiment, the method further comprises, after the real-time traffic data obtaining step, a data difference analysis step of analyzing the difference between the obtained real-time traffic data and the historical traffic data, adjusting the obtained real-time traffic data based on the analysis result, and using the adjusted real-time traffic data as the prediction input. Herein, the real-time traffic data is adjusted by means of statistical averaging.

In this way, it is possible to preclude improper or erroneous data from the real-time traffic data, such that the accuracy of the prediction input and thus the accuracy of the prediction result can be improved.

An apparatus for determining spatial influences among sections and an apparatus for traffic prediction are also provided.

In addition, the present invention discloses a method and system for traffic prediction.

To summarize, the present invention has the following advantages:

The performance can be greatly improved by, based on a reduced number of integrated sections, using spatial influence of section as a spatial operator and by employing a specific time sequence model, such as the STARMA model.

The spatial relations of multiple orders are incorporated. In actual prediction, any change in traffic condition at a node or on a section can be rapidly reflected in the corresponding spatial scope, which is impossible for the prediction algorithm considering only one single section.

The influences of neighboring sections of multiple spatial orders on the current section can be considered, which can be applied in prediction of future traffic and in compensation of calculation for current traffic to increase traffic coverage.

The concept of congestion indication is introduced to measure traffic condition in a spatial scope even more practically, thereby improving the prediction accuracy.

The system is designed for the entire road network and is thus highly applicable.

BRIEF DESCRIPTION OF THE DRAWINGS

The above and further objects, features and advantages can be more apparent from the following description of the preferred embodiments with reference to the figures, in which.

DETAILED DESCRIPTION OF PREFERRED EMBODIMENTS

Figure 1:
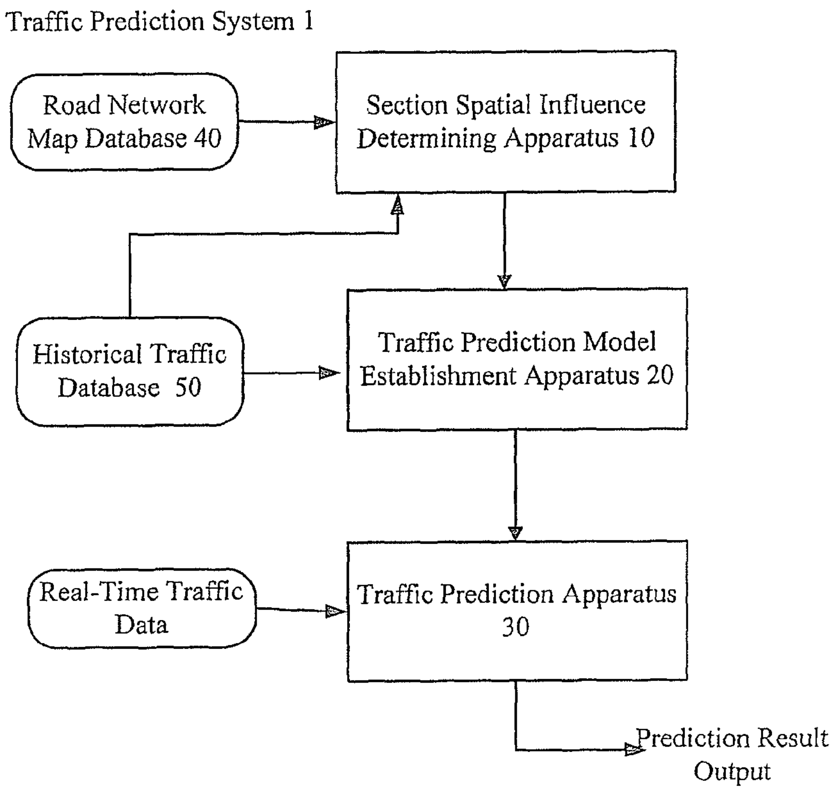
FIG. 1 is a diagram showing the configuration of a traffic prediction system.

The conventional technologies for traffic prediction fail to take full consideration of spatial influences among sections, so that the spatial relations among the sections cannot be fully utilized in prediction processing. The present invention provides a system and method for traffic prediction based on space-time relation by research on how to determine the scope of spatial influence, allocate weights for spatial influence objects, unify criteria for evaluation of traffic condition, as well as mine the relation between the historical traffic conditions of the current road and the roads within the spatial scope of influence for the current road. As shown in FIG. 1, a traffic prediction system 1 according to an embodiment of the present invention mainly comprises: a section spatial influence determining apparatus 10 for determining, for each of a plurality of sections for which the traffic condition is to be predicted, spatial influences on the section by its neighboring sections; a traffic prediction model establishment apparatus 20 for establishing, for each of the plurality of sections, a traffic prediction model by using the spatial influences determined at the section spatial influence determining apparatus 10 and historical traffic data of the plurality of sections; and a traffic prediction apparatus 30 for predicting traffic condition for each of the plurality of sections for a future time period by using real-time traffic data and the traffic prediction model established by the traffic prediction model establishment apparatus 20. In the traffic prediction system according to the present embodiment, the apparatus 10, and 30 can be separated, or any two or all of them can be integrated together. Also, each of the apparatus 10, 20 and 30 can be formed by separate or integrated functional units. Additionally, the traffic prediction system may further comprise: a road network map database 40 for storing road network data; and/or a historical traffic database 50 for storing historical traffic data for a plurality of sections. Herein, the historical traffic data may comprise, for a particular time period in a day, a travel speed at which a vehicle travels along the section, a travel time period required for a vehicle to pass through the section and a section congestion indication. Further, the historical traffic data may be statistically processed data, such as, for example, historical data subjected to a conventional statistical process for removing outliers and peaks or to a difference analysis. The road network map database 40 may employ a known road network, e.g., a GPS digital map. The historical traffic database may also be a known one. Moreover, the real-time traffic data can be obtained from an existing traffic monitoring system or real-time traffic data gathering system. Details for known technologies and functionalities are omitted herein, so as not to obscure the basic concept of the present invention. The following description focuses on the section spatial influence determining apparatus 10, the traffic prediction model establishment apparatus 20 and the traffic prediction apparatus 30 as mentioned above.

Most of the existing technologies for traffic prediction are based on part of arterial roads or highways and have thus incomplete road network and low applicability. The influence of traffic conditions of some side roads are of significance to urban traffic and may reflect, directly or indirectly, the traffic condition on corresponding arterial roads or ring roads. In this regard, the traffic prediction system of the present invention is developed for the complete road network.

For purpose of clear description of the concept according to the present invention, several terminologies will be explained in the first place.

Section: According to the present invention, a section can be a link known as a basic road element in most of known road networks, or a road segment obtained by recombining links in a road network, or a road segment from one intersection to another in a road network. As a basic road element, a link is short and has unstable traffic characteristics. Thus, the section of the present invention can be a road section reconstructed from links (by integrating, for example). A section may consist of one or more links, depending on applications. In this way, the number of prediction objects can be reduced and the speed and accuracy of prediction can be improved. Further, a section may be a road segment between key real road nodes, so that even more useful traffic information can be available. The section can be set depending on actual applications.

Figure 2:
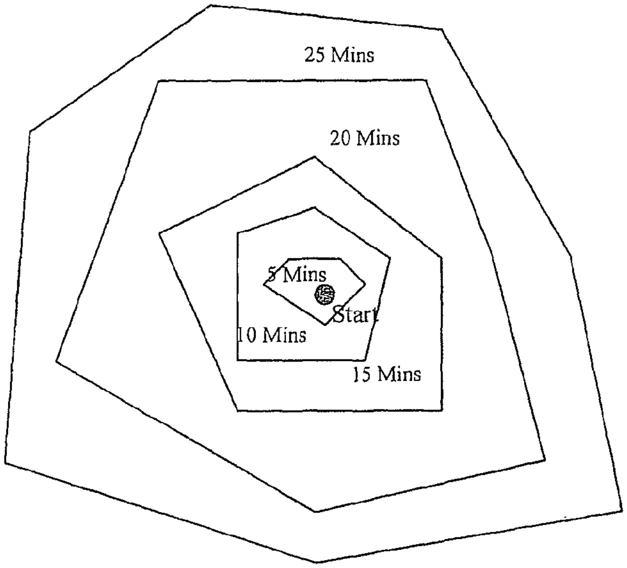
FIG. 2 is a schematic diagram illustrating the spatial scope of influence in terms of time metric.

'Time Order' & 'Spatial Order': A known time sequence model for space-time statistical data analysis, STARMA model, is assumed for example. The STARMA model can be generally expressed as:

$$z_t = \sum_{k=1}^{p} \sum_{l=0}^{\lambda_k} \phi_{kl} W_l z_{t-k} - \sum_{k=1}^{q} \sum_{l=0}^{m_k} \theta_{kl} W_l a_{t-k} + a_t,$$

where $z_t$ denotes an output from a random sequence at time t, p denotes a time hysteresis order, $\lambda_k$ denotes a spatial hysteresis order, $W_l$ denotes a spatial operator, which is generally a l-th order spatial correlation matrix, $\phi_{kl}$ denotes an auto-regressive correlation coefficient for a time order of k and a spatial order of l, $a_t$, denotes an input into a random sequence at time t, which is generally a white noise sequence, q denotes an order of moving average, $m_k$ denotes a moving average spatial hysteresis order, and $\phi_{kl}$ denotes a moving average correlation coefficient for a time order of k and a spatial order of l. Herein, k is a time order and l is a spatial order, both of which are hysteresis orders in the above STARMA. For example, when applied to the prediction processing to predict an output $z_t$ from a random sequence at time t, the respective outputs at t−1, t−2, . . . , t−k (1≤k≤p) can be used. In this case, $z_t$ has its first order output of the random sequence being output $z_{t-1}$ at time t−1 and its k-th order output of the random sequence being output $z_{t-k}$ at time t−k. Apparently, the larger p is, the larger a value of the time order k is, and the larger the time scope taken into account is. When an output $z_t$ from a random sequence at time t is to be predicted in STARMA, spatial influences should be considered in addition to the influences of the hysteresis sequence outputs at the respective times on $z_t$. $W_l$ is a spatial operator representing spatial influence where l is a spatial order. $\lambda_k$ denotes a scope of spatial orders to be considered for the time order of k, where $0 \le l \le \lambda_k$. The l equal to 0 indicates that only the object to be predicted is considered and the l equal to 1 indicates that the influence on the object to be predicted by its first order influential object is further considered. In general, a first order influential object refers to a neighboring object closest to the object to be predicted in spatial relation and a second order neighboring object refers to a neighboring object which is relatively close to the object to be predicted in spatial relation. In traffic condition prediction, a spatial scope having influence on the current section can be determined based on relative spatial location or time metric. For the relative spatial location, a first order influential object can be a neighboring section directly adjacent to the current section and a second order influential object can be a section directly adjacent to a first order neighboring section of the current section. Likewise, the first or second order influential object can be determined in terms of distance, such as at a certain distance from the current section. For the time metric, on the other hand, a first order influential object can be a neighboring section of the current segment in the spatial scope, which is reachable within a predetermined time period by starting from the current section. Herein, it is possible to find out a spatial scope reachable from the current section within a predetermined time period, at an average travel speed based on historical data of the current section or at the current speed. The predetermined time period can be a traffic data gathering period or a multiple thereof, e.g., 5 minutes, half an hour or one hour. FIG. 2 shows a schematic diagram of a spatial scope of influence for a 5-minute period for example. The spatial scope reachable from the current section within 5 minutes has a spatial order of 1 and the neighboring sections within that scope are the first order influential sections of the current section. Similarly, the spatial scope reachable from the current section within a period ranging from 5 to 10 minutes has a spatial order of 2, and the neighboring sections within that scope are the second order influential sections of the current section. According to the above equation, for a larger $\lambda_k$, a larger value of the spatial order l can be taken and a larger spatial scope can be taken into account.

Congestion Indication: As noted above, the traffic prediction system according to the present invention is developed for a complete road network which includes not only arterial roads, such as ring roads and highways, but also non-trunk roads such as side roads. A travel time or a travel speed on a section may be appropriate for analysis on time sequence of a single section as in a conventional traffic prediction algorithm, but cannot accurately reflect the traffic condition in a spatial sense if the spatial influence relation in the road network is considered. As different types of roads may have different roadway data and transportation to capacities, the same travel speed may indicate different levels of congestion for different classes of roads. A travel speed of 60 km/h, for example, can indicate a certain level of congestion on highway or a smooth traffic on an ordinary urban street. Thus, it is desired to consider different physical attributes of roads in traffic prediction based on space-time relation. As such, a unified index is required for indicating the levels of congestion of traffic condition. According to the present invention, Congestion Indication (CI) is used to indicate a level of congestion for a section of road, which can refer to a ratio between a real-time travel time required a vehicle to pass through a section and a corresponding travel time in a free flow condition:

$$CI(X_{i,t}) = \frac{T_{i,t}}{T_{i,normal}}$$

where $T_{i,t}$ denotes a travel time on a section X having an index of i at time/time period t and $T_{i,normal}$ denotes a travel time in a free flow condition on the section X having an index of i.

As an alternative, the CI can be a ratio between a real-time travel speed at which a vehicle travels on a section and a corresponding travel speed in a free flow condition:

$$CI(X_{i,t}) = \frac{V_{i,t}}{V_{i,normal}}$$

Where $V_{i,t}$ denotes a travel speed on a section X having an index of i at time/time period t and $V_{i,normal}$ denotes a travel speed in a free flow condition on the section X having an index of i.

In this way, the criterion for measuring traffic condition in a spatial scope is unified, which can be utilized to measure traffic in a spatial scope more practically and thereby improve prediction accuracy. The congestion indication as used herein can be represented in any other way known to those who skilled in the art (e.g., the reciprocal of the above CI can be used). Such apparent variations are encompassed by the scope of the present invention. During the prediction processing of the present invention, the CI can be calculated in real-time based on a travel speed or a travel time gathered by an existing real-time traffic information gathering system.

With the above explanations of terminologies, the section spatial influence determining apparatus 10, the traffic prediction model establishment apparatus 20 and the traffic prediction apparatus 30 will be detailed in the following.

Figure 3:
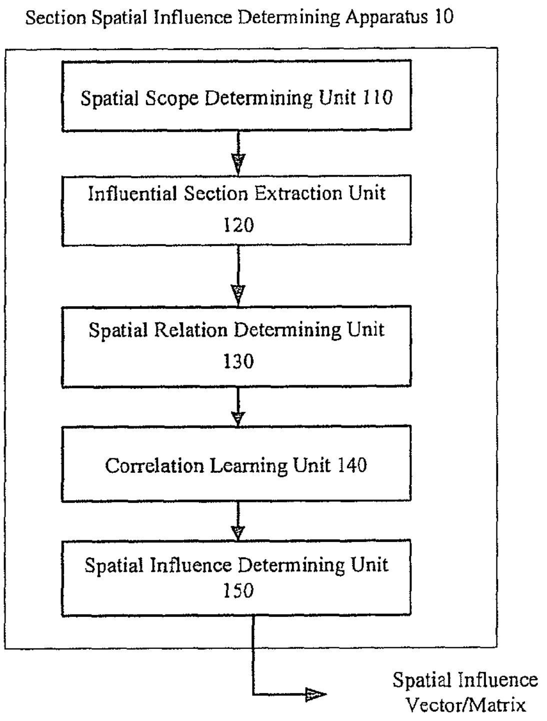
FIG. 3 is a schematic block diagram of the apparatus for determining spatial influences among sections as shown in FIG. 1.

FIG. 3 is a block diagram of the section spatial influence determining apparatus 10 as shown in FIG. 1. The determination of section spatial influence is critical for mining spatial relations among sections according to the present invention, with its major purpose being to determine influences of the changes in traffic conditions of neighboring sections of respective orders on the current section. As shown in FIG. 3, the section spatial influence determining apparatus 10 according to this embodiment comprises: a spatial scope determining unit 110 for determining, for each of sections in a road network, a spatial scope having influence on the section, wherein the spatial scope is of a spatial order of N, which is an integer equal to or greater than 1; an influential section extraction unit 120 for extracting, from the road network, neighboring sections of the section within the determined spatial scope, as N-th order influential sections for the section; a spatial relation determining unit 130 for classifying the spatial relation between each of the sections and its N-th order influential sections into one of predefined types of spatial relation; a correlation learning unit 140 for performing, for the classified type of spatial relation, correlation analysis on historical traffic data of the section and its N-th order influential sections of this type of spatial relation, to learn a correlation between the section and its N-th order influential sections for this type of spatial relation; a spatial influence determining unit 150 for determining spatial influences for the N-th order influential sections of the section based on the learned correlation, wherein each of the spatial influences reflects an extent to which the section is influenced by one of its N-th order influential sections.

It can be seen from the above explanation for the spatial order that the spatial scope determining unit 110 can determine the spatial scope having influence on the current section based on relative spatial location or time metric, which will be discussed below respectively.

On one hand, the spatial scope determining unit 110 can determine the spatial scope having influence on the current section based on the relative spatial locations between the current section and its neighboring sections. Herein, a first order influential section can refer to a neighboring section directly adjacent to the current section and a second order influential section can refer to a segment directly adjacent to a first order influential section of the current section. The spatial adjacency is exemplary only, for clearly illustrating the present invention, rather than limiting it. For example, a certain distance can be defined, in which case a first order influential section may refer to a neighboring section at the certain distance from the current section, and a second order influential section may refer to a neighboring section at a distance twice as long as the certain distance from the current section, and so on.

On the other hand, the spatial scope determining unit 110 can determine the spatial scope having influence on the current section based on the time metric, for example, the spatial scope which is a range by starting from the current section within a predetermined time period as shown in FIG. 2. It is possible to find out a spatial scope by starting from the current section within a predetermined time period, at an average travel speed based on historical data of the current segment or at the current speed. Herein, the predetermined time period can be a traffic data gathering period or a multiple thereof, so as to facilitate the gathering and analyzing of traffic data.

The influential section extraction unit 120 can extract, from the spatial scope of a spatial order of N as determined above, N-th order influential sections. For the N-th order influential section, the question is how to take full consideration of their influences on the current section.

Figure 7A:
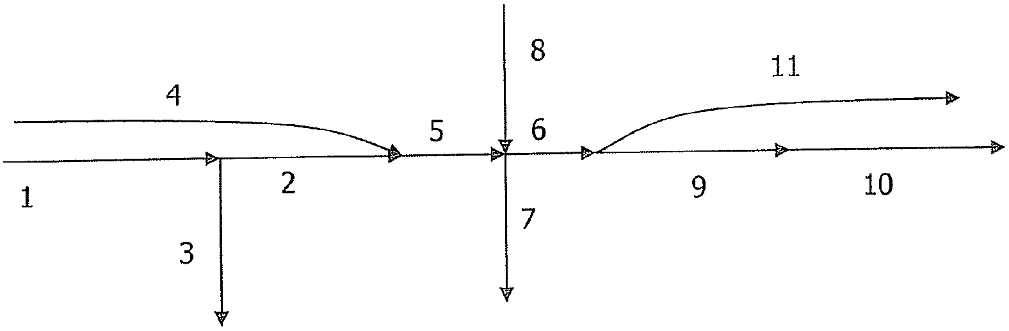
FIGS. 7(*a*) and 7(*b*) is a schematic diagram illustrating the spatial relations among sections in a road network according to an embodiment of the present invention.
Figure 7B:
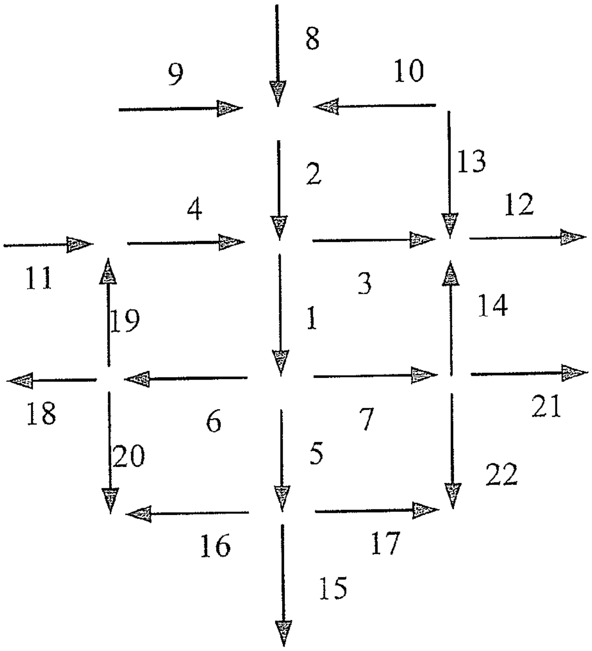

The spatial relation determining unit 130 determines the spatial relation among a plurality of sections, which is one of the essential concepts of the present invention. Based on analysis on road network and historical traffic data, the inventors of the application realize that different forms of road connectivity have different levels of influences on traffic conditions of the connected roads. For a intersection, for example, the traffic condition of a preceding road has much greater influence than an intersecting road. Thus, according the present invention, a plurality of types of spatial relations among sections is predefined and each of the spatial relations among a plurality of sections is classified into one of the predefined types of spatial relations. Table 1 shows the types of spatial relations according to the embodiment of the present invention as shown in FIG. 7(*a*), which are represented with codes 0 and A-H. These nine types of spatial relations are exemplary common spatial relations only. Any other spatial relations can be conceived by those who skilled in the art or any other types of spatial relations can be defined depending on practical requirements, which are all encompassed by the scope of the present invention. For example, the types of spatial relations can also comprise proceed straightforward, left turn and right turn.

TABLE 1

Types of spatial relations among segments

| Code | Description |
| --- | --- |
| 0 | No Relation |
| A | Precede Straight |
| B | Precede Merge, |
| C | Precede Intersect |
| D | Precede Diverge |
| E | Succeed Straight |
| F | Succeed Merge |
| G | Succeed Intersect |
| H | Succeed Diverge |

Referring to FIG. 7(*a*), a plurality of sections in an illustrative road network is numbered from 1 to 11. In order to clearly explain the spatial relations among the sections 1-11, the spatial relation between each section and its first order influential sections is considered herein for the spatial order of 1, which can be represented with the spatial relation matrix below:

$$revelation_1 = \begin{bmatrix} & 1 & 2 & 3 & 4 & 5 & 6 & 7 & 8 & 9 & 10 & 11 \\ 1 & 0 & E & G & 0 & 0 & 0 & 0 & 0 & 0 & 0 & 0 \\ 2 & A & 0 & 0 & 0 & F & 0 & 0 & 0 & 0 & 0 & 0 \\ 3 & C & 0 & 0 & 0 & 0 & 0 & 0 & 0 & 0 & 0 & 0 \\ 4 & 0 & 0 & 0 & 0 & F & 0 & 0 & 0 & 0 & 0 & 0 \\ 5 & 0 & B & 0 & B & 0 & E & G & 0 & 0 & 0 & 0 \\ 6 & 0 & 0 & 0 & 0 & A & 0 & 0 & C & H & 0 & H \\ 7 & 0 & 0 & 0 & 0 & C & 0 & 0 & A & 0 & 0 & 0 \\ 8 & 0 & 0 & 0 & 0 & 0 & G & E & 0 & 0 & 0 & 0 \\ 9 & 0 & 0 & 0 & 0 & 0 & D & 0 & 0 & 0 & E & 0 \\ 10 & 0 & 0 & 0 & 0 & 0 & 0 & 0 & 0 & A & 0 & 0 \\ 11 & 0 & 0 & 0 & 0 & 0 & D & 0 & 0 & 0 & 0 & 0 \end{bmatrix}$$

In this matrix, the relation between a section and the section itself is set to 0, i.e., a section has no relation with itself. Each row of the matrix represents the spatial relations between the current section and each of other sections. Herein, only the first order influential sections are considered. For example, the first order influential sections of the section 1 are the sections 2 and 3. The spatial relation between the sections 1 and 2 is E, i.e. precede straight; and the spatial relation between the sections 1 and 3 is G, i.e., precede intersect. The section 1 has no relation with other sections, which is indicated by 0. In addition, the spatial relations between each of the sections 2-11 and its first order influential sections are also indicated in the matrix.

Similarly, an additional spatial relation matrix can be constructed such that the each row of the matrix represents the spatial relations between each section and its N-th order influential sections.

Instead of constructing the above matrix representing the spatial relations among all the sections, a vector can be constructed, for each section, to represent the spatial relations between the segment and its N-th order influential sections for subsequent storage and calculation. For the segment 5, for example, its first order influential sections include it directly adjacent sections 2, 4, 6 and 7. Then, the spatial relation vector for the section 5 and its first order influential sections can be constructed as [B, B, E, G]. Further, its second order influential sections include sections directly adjacent to its first order influential sections. Thus, for each of the sections 2, 4, 6 and 7, it is possible to determine its first order influential sections first, from which the second order influential sections of the section 5 can then be determined. For example, the section 2 has its first order influential sections being the sections 1 and 5; the section 4 has its first order influential section being the section 5; the section 6 has its first influential sections being the segments 5, 8, 9 and 11; and the section 7 has its first influential sections being the sections 5 and 8. In this case, the second order influential sections of the section 5 are the sections 1, 8, 9 and 11. The spatial relation vector for the section 5 and its second order influential sections 1, 8, 9 and 11 can be constructed as [F, G, H, H]. Obviously, the influential sections can alternatively be determined in terms of time metric. In this case, for example, the sections 2, 4, 6 and 7 can be considered as the sections in a spatial scope with section 5 being the starting point within one data gathering period at an historical average speed of the section 5.

The approach for determination of spatial relations described herein is exemplary only. Depending on actual application, those who skilled in the art can conceive any other types of spatial relations and any other feasible determination approaches.

As noted above, based on the road network, the spatial relation determining unit 130 can classify the spatial relation between each of the sections among a plurality of sections and each of its N-th order influential sections into one of predefined types of spatial relation and provide the classified spatial relation to the correlation learning unit 140.

The correlation learning unit 140 is configured to perform correlation analysis on historical traffic data of each section and its N-th order influential sections, to learn a correlation for each spatial relation as determined. Herein, depending on actual requirements, short-term, mid-term or long-term historical traffic data can be utilized. The correlation analysis can be based on a conventional statistical analysis approach. The above spatial relations between each of the sections 1-11 and its first order influential sections are assumed, for example. For the type A, i.e., downstream proceed, the section pairs involved include the sections 2 and 1, sections 6 and 5, sections 7 and 8, as well as sections 10 and 9. In order to learn the section correlation for the type A, correlation analysis can be performed on the historical traffic data associated with these section pairs (i.e., sections 2 and 1, sections 6 and 5, sections 7 and 8, as well as sections 10 and 9) by using for example a conventional statistical analysis approach in which curve charts associated with the historical traffic data can be plotted with the coordinate axis indicating time scale. For the sections 2 and 1, for example, the horizontal and vertical axes are associated with the sections 2 and 1, respectively, and the time ranges from t−10 to t. In this case, the traffic data of the sections 2 and 1 at t−10, t−9, . . . , t can be retrieved from a historical traffic database and the traffic data points for the respective times can be plotted based on the traffic data. Herein, the traffic data points can be associated with travel speed, travel time or congestion indication. Then, a correlation function can be derived by curve fitting of the respective data points. As a simple example, for the type A, an approximate correlation function for the traffic data of the sections 2 and 1 may be a linear function $y=ax+b$ where y denotes the traffic data of the section 1 at the respective times, x denotes the traffic data of the section 2 at the respective times and a is denotes the slope of the linear function. The slope can be used as the correlation between the sections 2 and 1 for the type A since it can characterize the linear function. Similarly, correlation analysis can be performed on the historical traffic data for each of the other section pairs (i.e., sections 6 and 5, sections 7 and 8, as well as sections 10 and 9), to obtain a corresponding approximate correlation function. Then, a value characterizing the correlation function is used as the correlation of the corresponding section pair for the type A. In this way, a final correlation can be obtained as the section correlation for the type A by performing appropriate statistical processes, such as averaging and median extracting, on the respective correlations as obtained.

As for the other types of B-H, the above approach is also applicable for determination of section correlation. Obviously, the correlation learning unit 140 can apply any other conventional correlation analysis approaches for the above section correlation learning. Additionally, the section correlation for each type of spatial relations can be determined in advance based on historical traffic data, experiential values or depending on actual application.

Table 2 gives the results from the section correlation learning for each type of spatial relations according to this embodiment.

TABLE 2

Section correlation for each type of spatial relations

| Code | Description | Correlation |
|---|---|---|
| 0 | No Relation | 0 |
| A | Precede Straight | 1.00 |
| B | Precede Merge, | 0.80 |
| C | Precede Intersect | 0.50 |
| D | Precede Diverge | 0.50 |
| E | Succeed Straight | 1.00 |
| F | Succeed Merge | 0.80 |
| G | Succeed Intersect | 0.50 |
| H | Succeed Diverge | 0.50 |

The above correlations reflect that the correlation between two sections having a spatial relation of precede straight or succeed straight proceed is relatively large, i.e., the level of influence between them is relatively high. In contrast, the correlation between two sections having a spatial relation of downstream intersect, precede diverge, succeed intersect or succeed diverge is relatively small, i.e., the level of influence between them is relatively low. It can be seen that the above results are consistent with the influences among sections in the real world. That is, at an intersection, a proceeding road imposes much greater influence on traffic condition than an intersect road.

The correlation learning unit 140 learns the section correlations for each type of section spatial relations as described above, and then provides the learned section correlations to the spatial influence determining unit 150 for determining an extent to which each section is influenced by each of its N-th order influential sections.

The spatial influence determining unit 150 is configured to determine, for each section, levels of spatial influences for the spatial order of N based on the learned section correlations. Herein, the spatial relations between each of the above sections 1-11 and its corresponding first order influential sections are assumed for example. With reference to the above spatial relation matrix and Table 2, the spatial relation between the sections 1 and 2 is E, i.e., succeed straight; and the spatial relation between the sections 1 and 3 is G, i.e., succeed intersect. It can be seen that the section 1 is influenced by the sections 2 and 3. However, due to different spatial relations, the sections 2 and 3 have different correlations with the section 1 and thus different levels of influences on the section 1. The spatial relation between the sections 1 and 2 is succeed straight and the spatial relation between the sections 1 and 3 is succeed intersect. Thus, the section 2 has larger influence on the section 1 when compared with the section 3. In this embodiment, the spatial influence determining unit 150 utilizes an influence weight to reflect the level of influence of each influential section on the current segment. For example, based on the section correlation between a particular section and its N-th order influential sections, each of its N-th order influential sections can be allocated with an influential weight which can be used to determine the spatial influence of that influential section on the particular section. The above section 1 has a correlation of 1.00 with the section 2 and a correlation of 0.50 with the section 3, in which case the influence weight allocated to the section 2 can be calculated as 1.00/(1.00+0.50)=0.67 and the influence weight allocated to the section 3 as 0.50/(1.00+0.50)=0.33. Similarly, the section 2 has a correlation of 1.00 with the section 1 and a correlation of 0.80 with the section 5, in which case the influence weight allocated to the section 1 can be calculated as 1.00/(1.00+0.80)=0.55 and the influence weight allocated to the section 5 as 0.80/(1.00+0.80)=0.45. For each section as current section, the sum of influence weights allocated to all of its first order influential sections can be set as 1 and each of the influence weights can be used as the spatial influence on the current section by one of its N-th order influential sections. In this way, it is possible to easily and effectively reflect the levels of influences on the current section by its influential sections, thereby simplifying corresponding calculation. However, this is exemplary only; other influence weight levels or ratios can be employed alternatively depending on actual situation and application. The spatial influence determining unit 150 is further configured to determine the spatial influence on the current section by each of its first order influential sections. As an example, the spatial influences can be directly represented using the values of the respective influence weights, to obtain the following spatial influence matrix $W_1$.

$$W_1 = \begin{bmatrix} & 1 & 2 & 3 & 4 & 5 & 6 & 7 & 8 & 9 & 10 & 11 \\ 1 & 0 & 0.67 & 0.33 & 0 & 0 & 0 & 0 & 0 & 0 & 0 & 0 \\ 2 & 0.55 & 0 & 0 & 0 & 0.45 & 0 & 0 & 0 & 0 & 0 & 0 \\ 3 & 1.00 & 0 & 0 & 0 & 0 & 0 & 0 & 0 & 0 & 0 & 0 \\ 4 & 0 & 0 & 0 & 0 & 1.00 & 0 & 0 & 0 & 0 & 0 & 0 \\ 5 & 0 & 0.26 & 0 & 0.26 & 0 & 0.32 & 0.16 & 0 & 0 & 0 & 0 \\ 6 & 0 & 0 & 0 & 0 & 0.40 & 0 & 0 & 0.20 & 0.20 & 0 & 0.20 \\ 7 & 0 & 0 & 0 & 0 & 0.33 & 0 & 0 & 0.67 & 0 & 0 & 0 \\ 8 & 0 & 0 & 0 & 0 & 0 & 0.33 & 0.67 & 0 & 0 & 0 & 0 \\ 9 & 0 & 0 & 0 & 0 & 0 & 0.33 & 0 & 0 & 0 & 0.67 & 0 \\ 10 & 0 & 0 & 0 & 0 & 0 & 0 & 0 & 0 & 1.00 & 0 & 0 \\ 11 & 0 & 0 & 0 & 0 & 0 & 1.00 & 0 & 0 & 0 & 0 & 0 \end{bmatrix}$$

As an alternative, spatial influence vectors for the respective sections can be obtained for the spatial order of 1. For example, the spatial influence vector for the section 5 can be [0.26, 0.26, 0.32, 0.16].

As noted above, the section spatial influence determining apparatus 10 can determine, for a spatial order of N, levels of influences on each section by its N-th order neighboring sections, such that the influences on the current section by changes in traffic conditions of the neighboring sections can be introduced into the prediction process. As such, in actual prediction, any change in traffic condition at a node or on a section can be rapidly reflected in the corresponding spatial scope, which is impossible for the prediction algorithm considering only one single segment.

Furthermore, with the above determination approach for the spatial order of 1, the section spatial influence determining apparatus 10 can determine, for a number of other spatial orders, levels of influences on each section by its neighboring sections. In other words, for a changed spatial order N, spatial influences for the changed spatial order N can be determined for each section by the spatial scope determining step, the influential section extraction step, the spatial relation determining unit, the correlation learning unit and the spatial influence determining unit.

In this way, the spatial relations among all the sections in the road traffic network can be fully utilized to obtain, for each of a plurality of different spatial orders, influence of the changes in traffic condition of neighboring sections on the current section, such that the overall traffic condition can be reflected. Additionally, in actual prediction, it is possible to select a suitable spatial order based on the time period or traffic condition to be predicted, so as to determine a spatial scope to be considered for prediction. As such, the traffic prediction can be more flexible and effective.

In addition, the section spatial influence determining apparatus 10 can further comprise a storage unit (not shown) for storing, for each section, the determined spatial influences for at least one spatial order N, for example in a matrix or vector form as described above.

Figure 4:
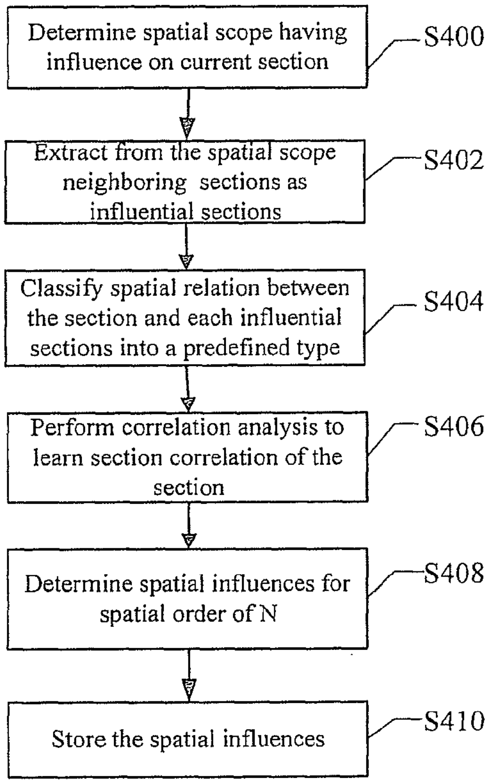
FIG. 4 is a flowchart showing a method for determining spatial influences among sections.

FIG. 4 is a flowchart showing the method for determining spatial influences among sections. In the section spatial influence determining process performed by the section spatial influence determining apparatus 10, for each of sections in a road network, a spatial scope having influence on the section is determined at step 400, as shown in FIG. 4. At step 402, neighboring sections of the section within the determined spatial scope are extracted from the road network, as N-th order influential sections for the segment. At step 404, the spatial relation between each of the sections and each of its N-th order influential sections is classified into one of predefined types of spatial relation. At step 406, for the classified type of spatial relation, correlation analysis is performed on historical traffic data of the section and its N-th order influential sections of this type of spatial relation, to learn a correlation between the section and its N-th order influential sections for this type of spatial relation. At step 408, spatial influences of spatial order N for the section are determined based on the learned section correlation. Herein, the spatial order N can be changed and the spatial influences of a plurality of spatial orders can be determined for each section by repeating steps 400-408. At step 410, the determined spatial influences for at least one spatial order N is stored for each section.

The foregoing describes in detail the section spatial influence determining apparatus 10 in the traffic prediction system 1 according to the present invention, as well as the method for determining spatial influences among section as performed by the apparatus 10. The apparatus 10 and its corresponding method are capable of determining, for a plurality of spatial orders, levels of influences on each section by its neighboring sections. The determined spatial influences can be used as a spatial factor in traffic prediction model establishment and traffic prediction. In this way, the spatial relations among sections in a road traffic network itself can be fully utilized and the influence of changes in traffic conditions of neighboring sections on the current segment is considered for various spatial orders.

A detailed description of the traffic prediction model establishment section in the traffic prediction system 1 of the present invention will be given below. The traffic prediction system 1 comprises a traffic prediction model establishment apparatus 20 which is configured to establish, for each of the plurality of sections to be predicted, a traffic prediction model by using the spatial influences determined at the section spatial influence determining apparatus 10 and historical traffic data of the plurality of sections. As an example, the traffic prediction model establishment apparatus 20 may obtain historical traffic data of a plurality of sections for a particular period, estimate individual parameters for a predetermined prediction model based on the obtained historical traffic data and the spatial influence for each of the plurality of sections as determined at the section spatial influence determining apparatus 10, and substitute, for each section, the estimated parameters and the spatial influences for the section into the predetermined prediction model, so as to establish a traffic prediction model of the section for the particular period. Also, based on the obtained historical traffic data and the spatial influence for each of the plurality of sections, the traffic prediction model establishment apparatus 20 can multiply the spatial influence for each of the plurality of sections with the historical traffic data of all the neighboring sections of the section for the spatial order associated with the spatial influence, so as to obtain a sample for model establishment. In this case, the estimation of parameters is conducted based on the obtained sample. However, the generation of the sample is optional and the parameters can be estimated by directly inputting the historical traffic data and the spatial influences.

In the traffic prediction according to the present invention, a time sequence model, which is commonly used in statistical analysis and incorporates spatial relations, can be utilized, including a Space-Time Auto Regression (STAR) model and a Space-Time Auto Regression Moving Average (STARMA) model, both of which are suitable for analysis on space-time statistical data. Alternatively, any other suitable time sequence model incorporating spatial relations can be used. The spatial influences among sections as determined by the section spatial influence determining apparatus 10 can be used as a spatial operator in a prediction model, such that the influences of neighboring sections on the current section to be predicted can be taken into account during model establishment.

In this embodiment, the historical traffic data of a plurality of sections for a number of periods can be retrieved from a historical traffic database. For each section, the traffic prediction model establishment apparatus 20 estimates, for a time order and a spatial order specified for the employed time sequence model, parameters for the predetermined time sequence model based on the historical data and spatial influences for the specified time and spatial orders. Additionally, the traffic prediction model establishment apparatus 20 is configured to substitute, for each section, the estimated parameters and the spatial influences for the section into the predetermined time sequence model, so as to establish a traffic prediction model of the section for the specified time and spatial orders. Herein, the traffic prediction model establishment apparatus 20 may utilize a conventional modeling approach. In the following, the sections in the schematic diagram of the road network as shown in FIG. 7(*b*) are taken as an example to describe the modeling process by the traffic prediction model establishment apparatus 20 based on the STAR model.

The STAR model can be represented as follows:

$$z_t = \sum_{k=1}^{p} \sum_{l=0}^{\lambda_k} \phi_{kl} W_l z_{t-k},$$

where $z_t$ denotes an output from a random sequence at time t, p denotes a delayed time order, $\lambda_k$ denotes a delayed spatial order, $W_l$ denotes a spatial operator of the STAR model, which is represented as a l-th order spatial influence vector or matrix as determined by the section spatial influence determining apparatus 10 of the present invention, and $\phi_{kl}$ denotes a coefficient for a time order of k and a spatial order of l, i.e., the coefficient to be estimated. When compared with the above STARMA model, the items of moving average and white noise sequence are omitted in the STAR model as both items are mainly used for model adjustment and are not essential for construction of the model. Therefore, the STAR model is adopted herein to clearly illustrate the basic concept of the present invention.

When applied to traffic prediction, $z_t$ represents traffic condition of the section to be predicted, i.e., traffic data for a period centered at time t, which reflects the traffic condition, such as congestion level, for the period. The traffic data can be a travel speed, a travel time or a congestion indication. The prediction is based on the historical traffic data, that is, on the traffic data for time periods centered at respective times t−1, t−2, . . . , t−k. $W_l$ denotes a l-th order spatial influence vector or matrix. Then, the establishment of the model mainly involves estimation of the efficient $\phi_{kl}$ for a time order of k and a spatial order of l.

As an example, the estimation of parameters is performed under an assumption that p=2 and $\lambda_k$=2. In this case, the prediction model becomes the following equation (1):

$$z_t=\phi_{11}\times S_{1,t-1}+\phi_{12}\times S_{2,t-1}+\phi_{21}\times S_{1,t-2}+\phi_{22}\times S_{2,t-2}, S=W_l z_t. \quad (1)$$

Herein, the parameters to be predicted include $\phi_{11}$, $\phi_{12}$, $\phi_{21}$ and $\phi_{22}$. The section 1 as shown in FIG. 7(*b*) is assumed as the current section, which has 6 first order neighboring sections numbered as 2 to 7, respectively, and 15 second order neighboring sections numbered as 8 to 22, respectively. The section spatial influence determining apparatus 10 is used to determine the spatial relations between the section 1 and its first order and second order neighboring sections. The types of spatial relations used herein include proceed straightforward, left turn and right turn. Further, the section spatial influence determining apparatus 10 is used to learn, for the spatial orders of 1 and 2, the section correlations for these types of spatial relations (i.e., proceed straightforward, left turn and right turn) as follows:

proceed straightforward: 1; left turn: 0.8 and right turn: 0.6.

Next, according to the above method, the section spatial influence determining apparatus 10 obtains the spatial influences on the section 1 by its first order and second order neighboring sections, as follows:

Section: 2 3 4 5 6 7

1st order spatial influences $W_1$ = [0.200, 0.170, 0.130, 0.200, 0.130, 0.170];

Section: 8 9 10 11 12 13

2nd order spatial influences $W2$ = [0.082, 0.049, 0.066, 0.082, 0.082, 0.049, 14 15 16 17 18 19 20 21 22

0.066, 0.082, 0.049, 0.066, 0.082, 0.049, 0.066, 0.082, 0.049].

Again, the spatial influences can be determined by the section spatial influence determining apparatus 10 in advance.

The historical traffic data can be retrieved from the historical traffic database. Herein, the congestion indications are used as the traffic data, which are exemplified as follows:

TABLE 3

Historical traffic data for the spatial order of 1

| | Section | | | | | | |
|---|---|---|---|---|---|---|---|
| Time Period | 1 | 2 | 3 | 4 | 5 | 6 | 7 |
| 2009_7_1_10 | 1.472 | 1.366 | 1.365 | 1.097 | 1.489 | 1.309 | 1.921 |
| 2009_7_1_11 | 1.913 | 1.298 | 1.267 | 1.469 | 1.654 | 1.722 | 1.921 |
| . . . | . . . | . . . | . . . | . . . | . . . | . . . | . . . |
| 2009_m_n_t | 1.398 | 1.093 | 1.170 | 1.386 | 1.406 | 1.446 | 1.743 |

TABLE 4

| Historical traffic data for the spatial order of 2 | | | | | | | | | | | | | | | | |
|---|---|---|---|---|---|---|---|---|---|---|---|---|---|---|---|---|
| | Section | | | | | | | | | | | | | | | |
| Time Period | 1 | 8 | 9 | 10 | 11 | 12 | 13 | 14 | 15 | 16 | 17 | 18 | 19 | 20 | 21 | 22 |
| 2009_7_1_10 | 1.472 | 1.292 | 1.911 | 1.721 | ... | ... | ... | ... | ... | ... | ... | ... | ... | ... | ... | ... |
| 2009_7_1_11 | 1.913 | 1.424 | 1.656 | 1.232 | ... | ... | ... | ... | ... | ... | ... | ... | ... | ... | ... | ... |
| ... | ... | ... | ... | ... | ... | ... | ... | ... | ... | ... | ... | ... | ... | ... | ... | ... |
| 2009_m_n_t | 1.398 | 1.292 | 1.258 | 1.265 | ... | ... | ... | ... | ... | ... | ... | ... | ... | ... | ... | ... |

Each row of Table 3 or Table 4 constitutes a traffic data vector $z_t$ for a corresponding time period.

With the above spatial influences $W_1$ and $W_2$ as well as the historical traffic data vectors, a sample generation unit 240 can calculate $S_{l,t}=W_l \times z_t$ as a model sample for estimation of parameters. Particularly, with respect to $z_t$ for the period centered at time t, $S_{1,t-1}=W_1 \times z_{t-1}$, $S_{2,t-1}=W_2 \times z_{t-1}$, $S_{1,t-2}=W_1 \times z_{t-2}$ and $S_{2,t-2}=W_2 \times z_{t-2}$. The respective values of the parameters $\phi_{11}$, $\phi_{12}$, $\phi_{21}$ and $\phi_{22}$ can be calculated by substituting $z_t$ and $S_{1,t-1}, \ldots, S_{2,t-2}$ for each period into equation (1). Herein, depending on actual requirements, the estimation of the parameters can be based on short-term, mid-term or long-term historical traffic data. A number of sets of estimated parameter values can be obtained, from which optimal estimated parameter values can be found by using a conventional statistical evaluation approach, e.g., by analyzing statistical values such as standard deviation and variance.

For the section 1, the traffic prediction model for the time order of 2 and the spatial order of 2 can be established by substituting the estimated parameters and the spatial influences for the section 1 into equation (1), as follows:

$$z_t=0.17499\times W_1 z_{t-1}+0.37183\times W_2 z_{t-1}+0.13391\times W_1 z_{t-2}+0.23458\times W_2 z_{t-2}. \quad (2)$$

The specific calculation processes for the above parameter estimation and statistical evaluation can be based on conventional approaches and the details thereof can be omitted herein.

Furthermore, for a changed time period and/or time order and/or spatial order, the traffic prediction model establishment apparatus 20 can establish, for each section, a corresponding traffic prediction model based on the historical traffic data and spatial influences corresponding to the changed time period and/or time order and/or spatial order. In the above example, a traffic prediction model is established for the section 1 with respect to the time period centered at time t, the spatial order of 2 and the time order of 2. In addition, the traffic prediction model establishment apparatus 20 can establish for the section 1 a traffic prediction model with respect to a time period centered at time t, a spatial order of 3 and a time order of 2, a traffic prediction model with respect to a time period centered at time t+1, a spatial order of 3 and a time order of 3, and the like. In this way, a section may have a number of traffic prediction models each corresponding to one of different time periods and/or time orders and/or spatial orders. As such, prediction models for different time scopes and spatial scopes can be established for each section by incorporating different situations of the section for different time periods, such that the traffic prediction can be more flexible and effective. Also, the traffic prediction model establishment apparatus 20 can be configured to store at least one traffic prediction model established for each section. A stored prediction model for a corresponding section can be selected for traffic prediction.

Figure 5:
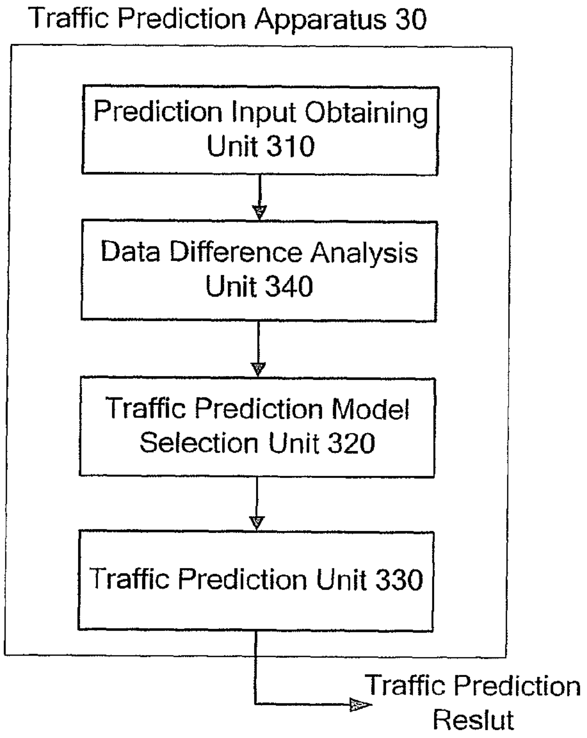
FIG. 5 is a schematic block diagram of the traffic prediction apparatus as shown in FIG. 1.

Details of the traffic prediction section in the traffic prediction system 1 according to the present invention will be given below. The traffic prediction system 1 comprises a traffic prediction apparatus 30 adapted for selecting from the models established by the traffic prediction model establishment apparatus 20 a prediction model for each section and performing traffic prediction for a future time period based on real-time traffic data. FIG. 5 is a structural diagram of the traffic prediction apparatus 30 as shown in FIG. 1, which comprises: a prediction input obtaining unit 310 for obtaining real-time traffic data for a plurality of sections within one or more time periods, as a prediction input; a traffic prediction model selection unit 320 for selecting a traffic prediction model for each of the sections whose traffic is to be predicted, based on a future time period for which the prediction is to be made and/or a specified time order and/or spatial order, wherein the traffic prediction model is a time sequence model incorporating is spatial relation, and the spatial relation is represented by spatial influences among the sections as determined by the section spatial influence determining apparatus 10 (e.g., the traffic prediction model can be established by the traffic prediction model establishment apparatus 20 according to the above procedures); and a traffic prediction unit 330 for predicting traffic of each of the section for a future time period after a specified time period by using the prediction input and the selected traffic prediction model. The traffic prediction apparatus 30 can further comprise: a data difference analysis unit 340 for analyzing the difference between the real-time traffic data obtained by the prediction input obtaining unit 310 and the historical traffic data, adjusting the obtained real-time traffic data based on the analysis result, and using the adjusted real-time traffic data as the prediction input. The data difference analysis unit 340 can be configured to adjust the real-time traffic data using a conventional statistical averaging approach, so as to remove outliers and peaks from the real-time traffic data and to improve the accuracy of the prediction input. The prediction input obtaining unit 310 is configured for obtaining from an existing real-time traffic monitoring system the real-time traffic data for a plurality of sections, including a travel speed or travel time, and for calculating in real-time a congestion indication based on the travel speed or travel time. The traffic prediction model selection unit 320 is configured for selecting, for each of the sections whose traffic is to be predicted, from the traffic prediction models established by the traffic prediction model establishment apparatus 20 traffic prediction models for different time orders and/or spatial orders, based on a future time period to be predicted. As a simple example, this selection can be specified by an operator. For an arterial road in rush hours, for example, a prediction model having a large time order and a large spatial order can be selected, so as to consider influences in a large time and spatial scope. For a side road in non-rush hours, in contrast, a prediction model with a small time order and a small spatial order can be selected. In addition, for prediction models established from short-term, mid-term and long-term historical traffic data, the traffic prediction model can be selected depending on whether a short-term, mid-term or long-term traffic is to be predicted. The traffic prediction unit 330 is configured for predicting traffic for a future time period based on the prediction input from the prediction input obtaining unit 310 or the data difference analysis unit 340 and the selected traffic prediction model. As for the above example, in order to predict the traffic $z_t$ of the section 1 for a time period centered at time t, the prediction inputs can be obtained based on the real-time traffic data $z_{t-1}$ and $z_{t-2}$: $S_{1,t-1}=W_1\times z_{t-1}$, $S_{2,t-1}=W_2\times z_{t-1}$, $S_{1,t-2}=W_1\times z_{t-2}$ and $S_{2,t-2}=W_2\times z_{t-2}$. These prediction inputs are then substituted into equation (2) for calculating $z_t$ as the prediction result.

The traffic prediction apparatus 30 can further comprise a prediction result output unit (not shown) for storing and outputting the prediction result.

Figure 6:
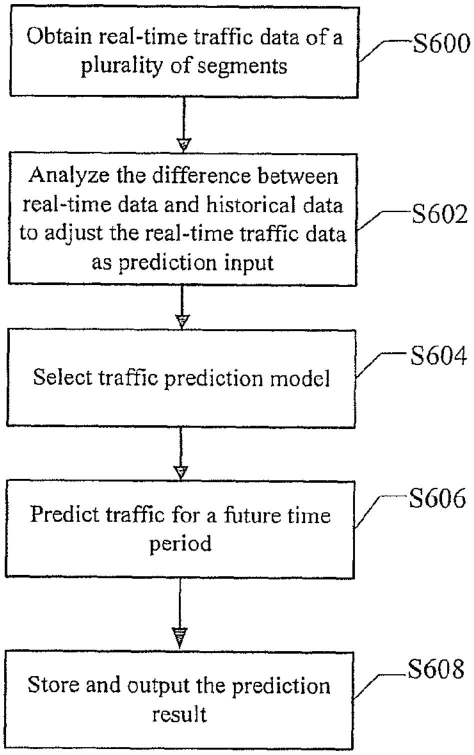
FIG. 6 is a flowchart showing a traffic prediction method.

FIG. 6 is a flowchart of the traffic prediction method, which illustrates the operation of the traffic prediction apparatus 30. At step 600, the prediction input obtaining unit obtains real-time traffic data for a plurality of sections within one or more time periods. At step 602, the data difference analysis unit 340 analyzes the difference between the real-time traffic data obtained by the prediction input obtaining unit 310 and the historical traffic data, adjusts the obtained real-time traffic data based on the analysis result, and using the adjusted real-time traffic data as the prediction input. At step 604, the traffic prediction model selection unit 320 selects a traffic prediction model for each of the sections whose traffic is to be predicted, based on a future time period for which the prediction is to be made. At step 606, the traffic prediction unit 330 predicts traffic of each of the section for a future time period after a specified time period by using the prediction input and the selected traffic prediction model. At step 608, the prediction result output unit stores and outputs the prediction result.

The traffic prediction system of the present invention has been described above, which is capable of predicting future traffic and calculating compensation for current traffic, in order to increase traffic coverage rate. For example, for the sections as shown in FIG. 7(*a*), the traffic condition of the section 5 can be estimated given the predicted traffic conditions for the sections 2 and 4. In the case where the sections and 4 each have a high level of congestion, the traffic on the section 5 can be considered to be congested.

It should be noted that the foregoing illustrates the solutions of the present invention by way of example only and is not intended to limit the present invention to the steps and element structures as described above. It is possible to adjust and modify such steps and element structures as desired. Thus, some of the steps and elements are not essential for implementing the general concept of the present invention. Accordingly, the essential technical features of the present invention are limited by only the minimum requirements for implementing the general concept of the present invention, rather than the above particular embodiments.

To this end, the present invention has been disclosed with reference to the preferred embodiments thereof. It can be appreciated that any other modifications, alternatives and additions can be made by those who skilled in the art without departing from the spirits and scope of the present invention. Therefore, the scope of the present invention is not limited to the above particular embodiments, but only limited by the claims as attached.

What is claimed is:

1. A method for determining spatial influences among sections, comprising:

determining, for each of sections in a road network, a spatial scope having influence on the section, wherein the spatial scope is of a spatial order of N, which is an integer equal to or greater than 1;

extracting, from the road network, neighboring sections of the section within the determined spatial scope, as N-th order influential sections for the section;

classifying the spatial relation between each of the sections and each of its N-th order influential sections into one of predefined types of spatial relation;

performing, for the classified type of spatial relation, correlation analysis based on historical traffic data of the section and its N-th order influential sections of this type of spatial relation, to learn a correlation between the section and its N-th order influential sections for this type of spatial relation; and step of determining spatial influences of spatial order N for the section based on the learned correlation, wherein each of the spatial influences reflects an extent to which the section is influenced by one of its N-th order influential sections.

2. The method of claim 1, wherein in the spatial scope determining operation, the spatial scope having influence on the section is determined according to the relative spatial locations of the sections in the road network.

3. The method of claim 1, wherein in the spatial scope determining operation, for each of the sections in the road network, a spatial scope that can be reached within a preset time period by starting travel from the section is determined as the spatial scope having influence on the section.

4. The method of claim 1, wherein the predefined types of spatial relation comprise no relation, precede straight, precede merge, precede intersect, precede diverge, succeed straight, succeed merge, succeed intersect, and succeed diverge; or the predefined types of spatial relation comprise straight-forward, left turn and right turn.

5. The method of claim 1, wherein in the spatial influence determining operation, each of the N-th order influential sections of a section is allocated with an influential weight based on the correlation between the section and the N-th order influential section, and the spatial influence on the section by the N-th order influential section is determined using the influential weight.

6. The method of claim 1, wherein the spatial influences on a section by its N-th order influential sections are represented in a vector having a dimension equal to the number of its N-th order influential sections.

7. The method of claim 1, wherein the spatial influences among all of a plurality of sections are represented in a M×M matrix, M being equal to the number of the plurality of sections and each row or each column of the matrix representing the spatial influences on one of the plurality of sections by its N-th order influential sections.

8. The method of claim 1, wherein, for a changed spatial order N, spatial influences for the changed spatial order N are determined for each of the sections through the spatial scope determining operation, the influential section extraction operation, the spatial relation determining operation, the correlation learning operation and the spatial influence determining operation.

9. The method of claim 1, further comprising:
storing, for each of the sections, the determined spatial influences for at least one spatial order N.

10. The method of claim 1, wherein the historical traffic data comprise, for a particular time period in a day, at least one of the following historical traffic data for each section:
a travel speed at which a vehicle travels along the section,
a travel time period required for a vehicle to travel through the section,
a section congestion indication representing a ratio between an actual travel time period required by a vehicle to actually travel through the section and
a free flow travel time period expected for a vehicle to travel through the section in a free flow condition, or representing a ratio between an actual travel speed at which a vehicle actually travels along the section and a free flow travel speed at which a vehicle travels along the section in a free flow condition.

11. The method of claim 1, wherein a section comprises one of:
a link as basic road element of a road network,
a road segment obtained by analyzing a road network and building a mapping between road segments and links; and
a road segment from one intersection to another adjacent intersection in the road network.

12. A traffic prediction method, comprising:
obtaining real-time traffic data for a plurality of sections within one or more time periods, as prediction input;
selecting a traffic prediction model for each of the sections whose traffic is to be predicted, based on a future time period for which the prediction is to be made and/or a specified time order and/or spatial order, wherein the traffic prediction model is a time sequence model considering spatial relation, and the spatial relation is represented by the spatial influences among the sections as determined by a method for determining spatial influences among sections according to claim 1; and
predicting traffic of each of the sections for a future time period after a specified time period by using the prediction input and the selected traffic prediction model.

13. The method of claim 12, wherein the traffic prediction model comprises a Space-Time Auto Regression (STAR) model or a Space-Time Auto Regression Moving Average (STARMA) model.

14. The method of claim 12, further comprising, after the prediction input obtaining operation:
analyzing the difference between the obtained real-time traffic data and the historical traffic data, adjusting the obtained real-time traffic data based on the analysis result, and using the adjusted real-time traffic data as the prediction input.

15. The method of claim 14, wherein in the data difference analysis operation, the obtained real-time traffic data is adjusted by way of statistical averaging.

16. An apparatus for determining spatial influences among sections, comprising:
a spatial scope determining unit, implemented by a processor, configured to determine, for each of sections in a road network, a spatial scope having influence on the section, wherein the spatial scope is of a spatial order of N, which is an integer equal to or greater than 1;
an influential section extraction unit configured to extract, from the road network, neighboring sections of the section within the determined spatial scope, as N-th order influential sections for the section;
a spatial relation determining unit configured to classify the spatial relation between each of the sections and its N-th order influential sections into one of predefined types of spatial relation;
a correlation learning unit configured to perform, for the classified type of spatial relation, correlation analysis on historical traffic data of the section and its N-th order influential sections of this type of spatial relation, to learn a correlation between the section and its N-th order influential sections for this type of spatial relation; and
a spatial influence determining unit configured to determine spatial influences for the N-th order influential sections of the section based on the learned correlation, wherein each of the spatial influences reflects an extent to which the section is influenced by one of its N-th order influential sections.

17. The apparatus of claim 16, wherein the spatial scope determining unit determines the spatial scope having influence on the section according to the relative spatial locations of the sections in the road network.

18. The apparatus of claim 16, wherein the spatial scope determining unit determines, for each of the sections in the road network, a spatial scope that can be reached within a preset time period by starting travel from the section as the spatial scope having influence on the section.

19. The apparatus of claim 16, wherein the spatial influence determining unit allocates to each of the N-th order influential sections of a section with an influential weight based on the correlation between the section and the N-th order influential section, and determines the spatial influence on the section by its N-th order influential section using the influential weights.

20. A traffic prediction apparatus, comprising:
a prediction input obtaining unit configured to obtain real-time traffic data for a plurality of sections within one or more time periods, as prediction input;
a traffic prediction model selection unit configured to select a traffic prediction model for each of the sections whose traffic is to be predicted, based on a future time period for which the prediction is to be made and/or a specified time order and/or spatial order, wherein the traffic prediction model is a time sequence model considering spatial relation, and the spatial relation is represented by spatial influences among the sections as determined by an apparatus for determining spatial influences among sections according to claim 16; and
a traffic prediction unit configured to predict traffic of each of the section for a
future time period after a specified time period by using the prediction input and the selected traffic prediction model.

21. The apparatus of claim 20, further comprising:
a data difference analysis unit configured to analyze the difference between the obtained real-time traffic data and the historical traffic data, adjusting the obtained real-time traffic data based on the analysis result, and using the adjusted real-time traffic data as the prediction input.

22. A method for traffic prediction based on space-time relation, comprising:
determining, for each of a plurality of sections to be predicted, spatial influences on the section by its neighboring sections, by a method for determining spatial influences among sections according to claim 1;
establishing, for each of the plurality of sections to be predicted, a traffic prediction model by using the spatial influences determined at the section spatial influence determining operation and historical traffic data of the plurality of sections; and predicting traffic of each of the plurality of sections to be predicted for a future time period by using real-time traffic data and the traffic prediction model established at the traffic prediction model establishment operation.

23. A system for traffic prediction based on space-time relation, comprising:

a section spatial influence determining section, implemented by a processor, configured to determine, for each of a plurality of sections to be predicted, spatial influences on the section by its neighboring sections, by an apparatus for determining spatial influences among sections according to claim 16;

a traffic prediction model establishment section configured to establish, for each of the plurality of sections to be predicted, a traffic prediction model by using the spatial influences determined at the section spatial influence determining section and historical traffic data of the plurality of sections; and a traffic prediction section configured to predict traffic of each of the plurality of sections to be predicted for a future time period by using real-time traffic data and the traffic prediction model established by the traffic prediction model establishment section.

24. The method of claim 1, wherein the spatial relation between each of the sections and each of its N-th order influential sections are classified into different groups based on the spatial relation.

25. The apparatus of claim 16, wherein the spatial relation between each of the sections and each of its N-th order influential sections are classified into different groups based on the spatial relation.

* * * * *

UNITED STATES PATENT AND TRADEMARK OFFICE

CERTIFICATE OF CORRECTION

PATENT NO. : 8,606,727 B2
APPLICATION NO. : 12/942783
DATED : December 10, 2013
INVENTOR(S) : Tao Wu et al.

It is certified that error appears in the above-identified patent and that said Letters Patent is hereby corrected as shown below:

In the Specification

Column 8, Line 19: After “10,” insert -- 20 --.

Column 12, Line 59: Delete “revelation$_1$” and insert -- relation$_1$ --.

Column 19, Line 50: Delete “$S{=}W_lz_t$.” and insert -- $S = W_l \times z_t$. --.

Signed and Sealed this
Twenty-fifth Day of November, 2014

Michelle K. Lee
*Deputy Director of the United States Patent and Trademark Office*